| COLUMN I | COLUMN II | | | COLUMN III | COLUMN IV |
|---|---|---|---|---|---|
| OUTPUT POSITION | CRYSTAL STATE | | | CHANGE IN CRYSTAL STATE TO SWITCH TO NEXT POSITION | SCR TO BE ACTIVATED TO SWITCH TO NEXT POSITION |
| | 20 | 50 | 80 | | |
| 7 | 1 | 0 | 0 | CHARGE 80 | SCR 100 |
| 6 | 1 | 0 | 1 | CHARGE 50 | SCR 70 |
| 5 | 1 | 1 | 1 | DISCHARGE 80 | SCR 98 |
| 4 | 1 | 1 | 0 | DISCHARGE 20 | SCR 38 |
| 3 | 0 | 1 | 0 | CHARGE 80 | SCR 100 |
| 2 | 0 | 1 | 1 | DISCHARGE 50 | SCR 68 |
| 1 | 0 | 0 | 1 | DISCHARGE 80 | SCR 98 |
| 0 | 0 | 0 | 0 | CHARGE 20 | SCR 40 |

United States Patent Office 3,513,323
Patented May 19, 1970

3,513,323
LIGHT BEAM DEFLECTION SYSTEM
Glenn T. Sincerbox, and Jerry L. Reynolds, Wappingers, N.Y., assignors to International Business Machines Corporation, Armonk, N.Y., a corporation of New York
Filed Dec. 13, 1965, Ser. No. 513,241
Int. Cl. G02f *1/18, 1/24*
U.S. Cl. 250—225                                      3 Claims

---

ABSTRACT OF THE DISCLOSURE

This specification describes means for positioning a light beam in a number of different output locations in a preset scanning sequence. This is accomplished by an optical beam deflector and light sensitive devices. The light sensitive devices detect the light beam in any of the output locations of the optical deflector and vary control circuits for the deflector so as to cause the light beam to change to another of the output positions. This causes the light beam to continually move from output position to output position in accordance with a preset scanning sequence.

---

This invention relates to a high speed system for discretely positioning a beam of light, and more particularly to a light beam deflection system using electro-optic techniques to digitally index a beam of light.

Copending U.S. patent application, Ser. No. 285,832, filed June 5, 1963 and assigned to the same assignee as the present application, discloses an electro-optical system for incrementally positioning a light beam into a number of output positions by switching electrical energy to and from electrically responsive optical elements which control the deflection of the light beam. In certain applications for this type of system, such as optical displays, it is desirable to be able to position the light beam in its various output positions in some preset scanning sequence which will be repeated until the sequence is purposely stopped. In accordance with the present invention, this is accomplished by light sensitive devices which detect the light beam in any one of its output positions and in response thereto varies the supply of electrical energy to the electrically responsive optical elements so as to cause the light beam to change its output position. This is done at each of the output positions in the scanning pattern so that as soon as the light beam is detected in any given output position the supply of electrical energy to the electrically responsive optical elements is changed to cause the beam to shift to the next output position in the scanning sequence thereby causing the light beam to continually move from output position to output position in accordance with the preset scanning sequence.

Therefore, it is an object of the present invention to provide an improved optical scanning means.

It is another object of the present invention to provide a scanning means for an electro-optical switching system which moves a light beam in increments through a number of output positions; and It is still another object of the present invention to provide scanning means which optically detects the position of a light beam and thereafter deflects the light beam into a new position.

The foregoing and other objects, features and advantages of the present invention will be apparent from the following more particular description of the preferred embodiments of the invention as illustrated in the accompanying drawings of which:

Figure 1:
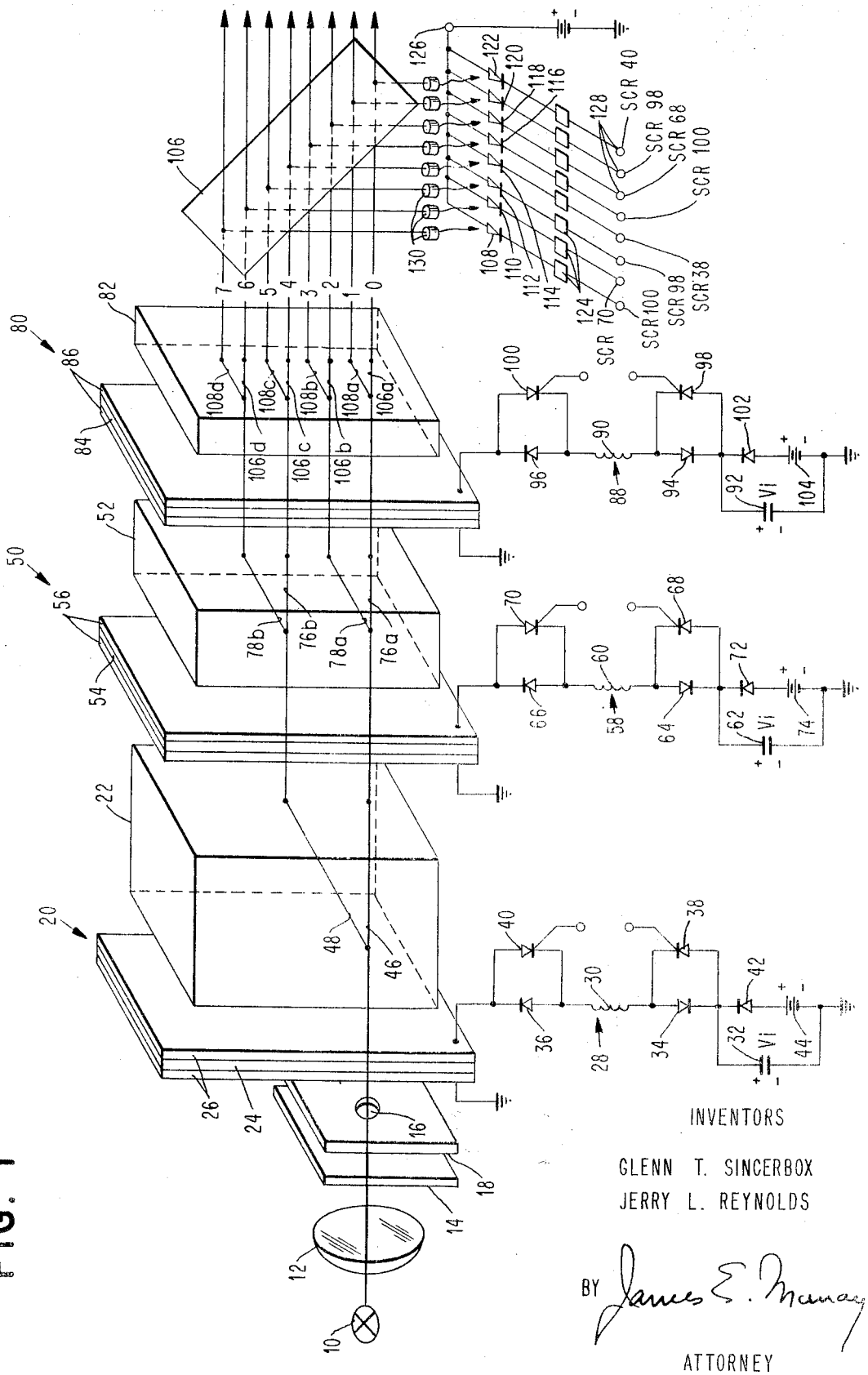
FIG. 1 is a perspective view of a preferred embodiment of the present invention.

In the embodiment shown in FIG. 1, high intensity light is obtained from light source 10. The light source 10 is preferably a monochromatic source of light and is conveniently a continuous wave or pulsed laser light source. However, other monochromatic light sources can be employed such as carbon and mercury arc lamps with the appropriate filters.

The light obtained from the light source 10 is first passed through collimating lens 12 where the light is collimated and then through a linear polarizer means 14 wherein the light is linearly polarized. Thereafter, a portion of the collimated, linearly polarized and preferably monomchromatic light is passed through an aperture 16 in a plate 18 to form a light beam which is directed through three light deflection stages.

In the first deflection stage, the light beam passes through an electrically controllable polarization means 20 and then through a birefringement means 22. The controllable polarization means 20 includes an electro-optical crystal 24, such as a potassium dihydrogen phosphate crystal, and also includees a pair of transparent electrodes 26 positioned on opposite sides of the electro-optic crystal 24. With the electrodes 26 at the same electrical potential, the electro-optic crystal 24 allows the polarized light beam to pass through without any change in its direction of polarization. However, when a potential difference is established between the electrodes 26, a change takes place in the birefringent properties of the crystal 24 that causes a phase retardation of the light beam which is a function of the magnitude of the potential difference that is established. When the magnitude potential difference established between the electrodes 26 is equal to the half wave length voltage for the crystal 24, which in the case of a potassium dehydrogen phosphate crystal is 3.4 kv., the phase retardation of the light beam results in a shift in the axis of polarization of the light beam by 90 degrees.

Electrically, the electro-optic crystal 24 behaves as a dielectric with a high dielectric constant and very low dielectric losses. Therefore, the controllable polarization means 20 acts as a capacitor which can be charged to its half wave length voltage to alter the axis of polarization of the light beam by 90 degrees and can be discharged to zero potential to allow the light beam to pass through without any alteration in its axis of polarization.

An electric circuit for charging and discharging the controllable polarization means is illustrated at 28. As illustrated in FIG. 1, one of the electrodes 26 is connected to ground while the other of the electrodes 26 is connected through an inductance 30 to one side of a tank capacitor 32 which is connected at its other side to ground. Arranged in the circuit at each end of the inductance are diodes 34 and 36 which are connected in a manner to block the flow of current toward the inductance but to permit current flow in the opposite direction. Bypassing the diodes 34 and 36 are circuits including silicon controlled rectifiers 38 and 40, respectively.

Assuming that the tank capacitor 30 is charged to an initial voltage $V_i$ and the voltage on the crystal 24 is zero, the conduction of SCR 38 while SCR 40 remains nonconductive results in a discharge of the tank capacitor 32 through SCR 38, inductance 30 and diode 36 to place a voltage across crystal 24. Since each of the circuit elements offers some resistance to the flow of current, all of the charge on the tank capacitor is not transferred to the crystal. Therefore, in order that a half wave voltage may exist on the crystal by the discharging of the tank capacitor, it is necessary that the initial voltage $V_1$ be greater than the half wave voltage by an amount equal to the voltage remaining on the tank capacitor after discharging.

The SCR 38 may be rendered conductive by momentarily biasing its gate positive with respect to its emitter. Once rendered conductive, the SCR 38 will remain conductive so long as the current flow from the capacitor 32 to the electrically controllable polarization means 20 remains above the sustaining level of the SCR. When the controllable polarization means 20 becomes fully charged and the current stops flowing through the SCR 38, the SCR 38 becomes nonconductive.

With the switch 40 open and the diode 36 blocking the flow of current toward the inductance 30 energy stored in the controllable polarization means 30 cannot be discharged back through the inductance to the capacitor 32. To reduce the potential difference across the crystal 24, the SCR 40 is rendered conductive by momentarily making its gate positive with respect to its emitter. The energy stored in the controllable polarization means 20 can then discharge through the SCR 40, the inductance 30 and the diode 34 to the tank capacitor 32. When the controllable polarization means 20 stops discharging current ceases to flow through the SCR 40 and SCR 40 becomes nonconductive.

Due to the losr resistance of the circuit, the transfer of the charge from the crystal 24 to the capacitor 32 is not complete and a small charge remains on the crystal. The residual charge is inconsequential in most applications. However, if a reduction of the charge on the crystal 24 to zero is necessary for a particular application, the electrodes 26 can be connected together by known switching means to accomplish this result.

The voltage on the tank capacitor 32 after the discharge of energy to it from the crystal 24 through the inductance 30 is less than the initial voltage $V_1$ by the amount of energy remaining on the crystal 24 when SCR 40 is opened. To compensate for this loss, the tank capacitor 32 is connected through a diode 42 to a DC source 44 which can charge the capacitor 32 back to the initial voltage $V_1$ through the diode 42. Diode 42 is connected in a manner to pass current from the DC source 44 to the tank capacitor 32 and to block current flow in the opposite direction.

The birefringent means 22 is a crystal which has been cut to allow an incoming light beam to pass through it either as an ordinary ray 46 or an extraordinary ray 48 depending on the axis of polarization of the light beam. If the axis of polarization of the light beam is not changed by the controllable polarization means 20 the light beam will pass through the birefringent means 22 as an ordinary ray 46. However, if the axis of polarization has been changed by 90° by charging the light controllable polarization means 20, the light beam will pass through the birefringent means as an extraordinary ray 48 and exit from the birefringent means 22 at a point which is vertically displaced from the exiting point of the ordinary ray 46.

After exiting from the birefringent means 22, the light beam passes through two more light deflection stages. The second light deflection stage has a controllable polarization means 50 and a birefringent means 52 like those in the first stage. The controllable polarization means 50 like the controllable polarization means 20 is made an electro-optic crystal 54 positioned between two transparent electrodes 56 and is controlled by electric circuit means 58, identical to the circuit means 28, for charging and discharging the controllable polarization means 50. The elements of the circuit means 58 have been numbered so that they differ by 30 from identical elements in circuit means 28. The elements of the circuit means 58 charge and discharge crystal 54 in the same manner in which the elements of the circuit means 28 charge and discharge crystal 24. Therefore, a detailed discussion of the operation of circuit means 58 would be repetition and is omitted.

Like the two previous stages the third stage has a controllable polarization means 80 and a birefringent means 82. The controllable polarization means 80 is made in the previously described manner with an electro-optic crystal 84 positioned between two transparent electrodes 86 and is controlled by electric circuit means 88 for charging and discharging the controllable polarization means 80. The electric circuit means 88 is identical to the electric circuit means 28, and the elements of the electric circuit means 88 have been numbered so that they differ by 60 from the same elements in circuit means 28. The elements of the circuit means 88 operate to charge and discharge the crystal 84 in the same manner in which the elements of circuit means 28 operate to charge and discharge the crystal 24. Therefore, a detailed description of the operation is omitted.

The optical path length which the light beam must travel through the respective birefringent means of each stage or the thicknesses of each birefringent means in a given stage is seen in the drawing to be different. The varying thicknesses of the birefringent means is necessary to give an independent discrete output position for all possible combinations of charged and discharged crystals. The preferred thickness variation in the birefringent means is a decrease by one half from one birefringent means to the next birefringent means. For example, birefringent means 52 is half as thick as birefringent means 22 and birefringent means 82 is half as thick as birefringent means 52. The possible non-redundant output light deflector system positions are then base two to the power of the number of the light deflection stages. Therefore, in the case of the disclosed embodiment there are eight non-redundant light output positions.

The invention of the embodiment of the present invention illustrated in FIG. 1 is initiated by a light beam passing from light source 10 through collimating lens 12, linear polarizer 14 and the aperture 18 of plate 16 to the first stage of the light deflector device. A small cross-sectional beam of collimated light, linearly polarized perpendicular to the plane of the drawing is thereby produced and transmitted through the three stages of the light deflection system. As shown there are eight different paths through the light deflection system. Depending on which path the light beam takes, the light beam will exit from the light deflection system in one of eight vertically displaced positions numbered 0 to 7 in FIG. 1. The path which the light beam does take will depend upon which of the electrically controllable polarization means 20, 50 and 80 are charged and which are not. For example, assume electrically controllable polarization means 20 is charged and the others are not charged. An electric field is thereby developed across electro-optic active crystal 24. The light beam passing through the electro-optic crystal 24 therefore has its plane of polarization rotated 90 degrees from its original entering position. The beam thus passes on to the first stage birefringent means 22 where it is received as the extraordinary ray and it passes along path 48. It exits from the birefringent crystal 22 parallel to but vertically separated from its entering position. Thereafter the light beam continues to the second light deflection stage where it passes through the electro-optic crystal 54 and the crystals companion transparent electrodes 56 without change in its polarization. The light beam therefore maintains the polarization gained from the first stage polarization means 20 and takes the extraordinary ray path 78b in the second stage birefringent crystal means 52. The light beam then passes through the third light deflection stage. Since there is no electric field across the third stage crystal 84, the light beam is received by the third stage birefringent crystal 82 as an extraordinary ray and passes through the third stage birefringent crystal 82 along the extraordinary ray path 108d exiting from the crystal at the uppermost output position 7.

To position the light beam into the lowermost output position 0, the controllable polarization means 20 is discharged so that no electric field is applied to any of the electro-optic means. In this case, the light beam remains linearly polarized as effected by the linear polarizer 14 and therefore passes through each of the birefringent means 22, 52 and 82 along their ordinary ray paths 46, 76a and 106a respectively. The light beam can be positioned in any of the other output positions falling between the 0 and 7 positions by having a specific combination of charged and discharged controllable polarization means 20, 50 and 80. For instance, assume the controllable polarization means 20 and 50 are charged and the controllable polarization means 70 isn't. Then, the linearly polarized beam enters the first stage controllable means 20 wherein the polarization of the beam is rotated 90 degrees. Thereafter the beam enters the first stage birefringent crystal 22 where it proceeds along the extraordinary ray path 48 and exits parallel to but spacially displaced from its entering position. The beam then enters controllable polarization means 50. Since the second stage electro-optic crystal 54 is also activated, the polarization of the light beam is again rotated 90 degrees. Therefore, the light beam then passes on to the second stage birefringent crystal means 52 wherein it passes through as an ordinary ray 76b. The polarization of the light beam is not changed in the third stage controllable means 70 since it is not charged and therefore the light beam continues through the third stage birefringent crystal 82 on ordinary ray path 106c and exits at output position 4, which is midway between the extreme cases discussed above.

Figures 2, 3:
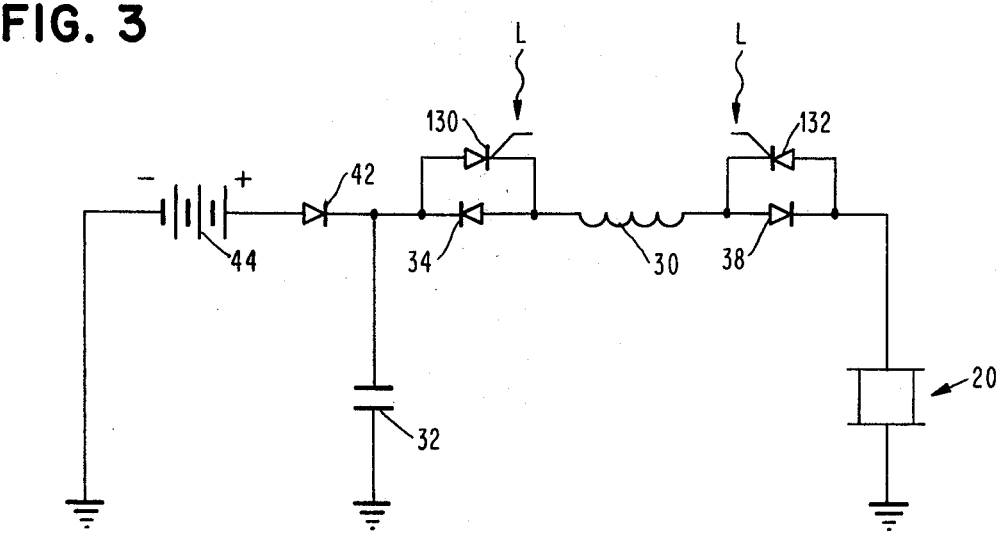
FIG. 2 is a chart illustrating how the light beam can be positioned into the various output positions shown in FIG. 1.
FIG. 3 is an electrical schematic of a portion of a second preferred embodiment of the present invention.

To position the light beam in the other of the eight output positions different combinations of the charged and discharged controllable polarization means 20, 50 and 80 are used. FIG. 2 is a chart showing the states in which the controllable polarization means must be put to position the light beam in each of the eight output positions. In Column I the eight output positions illustrated in FIG. 1 are listed. In Column II the states of the three electro-optic polarization means necessary to position the light beam into any given position are indicated along side that given position in Column I. Column II is divided into three sub-columns headed 20, 50 and 80 respectively. A one or a zero appears in each of the three sub-columns next to each of the eight output positions. The one indicates that the particular electro-optic device must be charged to position the light beam in the particular position and the zero indicates that the particular electro-optic crystal must be discharged to position the light beam in the particular output position. For instance, an examination of the chart will show that in order to position the light beam in output position 2 controllable polarization means 20 must be discharged and controllable polarization means 50 and 80 must be charged.

Column III of the chart shows what polarization means must be charged or discharged to shift the light beam from any one of the output positions 7 to 1 to the next lower output position and also shows what polarization means must be charged to shift the light beam from output position 0 to output position 7. Column IV of the chart shows which of the SCR's must be rendered conductive to charge or discharge the particular controllable polarization means mentioned in Column III. For example, to shift the light beam from output position 7 to output position 6, the controllable polarization means 80 is discharged as indicated in Column III. This is accomplished by rendering SCR 100 conductive as indicated in Column IV. Further, by way of example, to shift the light beam from output position 0 to output position 7, controllable polarization means 20 is charged as indicated in Column III and this is accomplished by rendering SCR 40 conductive as indicated in Column IV.

By examination of the chart it should be apparent that to shift from any output position to the next output position as mentioned above all that is necessary is to charge or discharge one of the controllable polarization means 20, 50 and 80 and that this may be accomplished by rendering one of the SCR's conductive. In accordance with the present invention, light sensitive means are employed to sense the position of the light beam in any given output position and to render the proper SCR conductive to shift the light beam to the next position in the sequence shown in Column 1 of the chart of FIG. 2.

As shown in FIG. 1, the light beam exiting from the crystal 82 in any one of the eight output positions impinges on a beam splitter 106 which allows a certain portion of the light from the light beam to pass through it to some device employing the positioned light beam in performing its function. The beam splitter also deflects a certain portion of the light from the light beam downwardly twards light sensitive diodes 108 through 122. These diodes are each connected in a separate series circuit with an amplifier or switch 124 between the positive terminal 126 of a DC source and the gating terminal of one of the SCR's. The particular SCR is indicated at the terminal 128 of each of the series circuits. Means 130 for collimating the light are provided so that each of the photosensitive diodes will respond to light in only one of the output positions. Therefore diode 108 responds to light only from output position 7, diode 110 responds to light only from output position 6 and so on.

Initially, all three of the controllable polarization means 20, 50 and 80 are discharged. Therefore, the light beam passes through the "0" output position. With the light beam in the zero output position, a certain portion of the light of the light beam is deflected by beam splitter 106 onto light sensitive diode 122, causing the diode 122 to conduct. This puts a positive potential at the input to the amplifier 124 in the series circuit with diode 122, and in response to this positive input, the amplifier provides a positive output to the gate of SCR 40 causing SCR 40 to conduct. When SCR 40 conducts the polarization means 20 is charged as previously described. Therefore, controllable polarization means 20 is charged and controllable polarization means 50 and 80 remain uncharged as shown in the chart of FIG. 2. This causes the light beam to shift from output position 0 to output position 7. Thus, light no longer reaches photosensitive diode 122 to keep SCR 40 gated conductive and therefore SCR 40 becomes nonconductive. However, since the light beam is in output position 7, light impinges on photoelectric diode 108 causing it to conduct and bias SCR 100 conductive. This charges controllable polarization means 80 so that both controllable polarization means 20 and 80 are charged while controllable polarization means 50 remains discharged. Thus the light beam will shift from output position 7 into output position 6 as is shown by the chart in FIG. 2. This process of shifting continues and the light beam is shifted into output position 5, then output position 4 and so on until the light beam returns to position 0 whereupon the shifting cycle repeats itself. Therefore the light beam is continually shifted from position to position in a repeating sequence until the light source 10 is extinguished.

If light activated silicon controlled rectifiers or LASCR's 130 and 132 are used in the circuits 28, 58 and 88 in place of the standard SCR's shown in FIG. 1, then the light deflected by the beam splitter 106 can be used to directly activate the charging and discharging circuits as shown in FIG. 3. This arrangement eliminates the need for the diodes 108 through 122 and the amplifier or switches 124.

While the invention has been particularly shown and described in reference to the illustrated embodiments thereof, it will be understood by those skilled in the art that the foregoing and other changes in form and details may be made therein without departing from the spirit and scope of the invention.

What is claimed is:

1. An electro-optic system for repeatedly moving a light beam emanating from a light source through a number of discrete output positions in a repeating sequence comprising:
   (a) a plurality of stages of electrically responsive light beam deflection means each having a separate electrical input and being located along the light beam for selectively directing the light beam into any one of the discrete output positions when a digitally coded combination of up and down signal levels is applied to the inputs of the stages, said stages of electrically responsive light beams each including a controllable polarization means which can be charged or discharged by the up and down signal levels to change the angle of polarization and a birefringent crystal means which allows the light beam to pass through either as an ordinary or extraordinary beam depending on the angle of polarization of the light beam after exiting from the controllable polarization means of the same stage;
   (b) control circuit means for raising and lowering the signal levels at the input of each of the stages independently of the input of all the other stages to change the signals at any one of said inputs between said up and down signal levels independently of said other inputs.
   (c) photoelectric means optically aligned with the electrically responsive light beam deflection means for detecting the light beam in any one of the discrete output positions, said photoelectric means including a separate photosensitive device to sense the light beam in each output position and provide an output signal indicative of the presence or absence of said light beam in that output position; and
   (d) coupling circuit means joining the control means to the photoelectric means and responsive to the output signal from the photoelectric means for any one of the discrete output positions to change the signal level at the input to one of the stages to change the digitally coded combination of signal levels applied to the inputs of the stages to that for the next output position in the repeating sequence including a separate circuit means coupling one of the photosensitive devices to one and only one of the control circuit means for making each of said control circuit means responsive to output signals from only one photosensitive device to charge one of the controllable polarization means and from only one other photosensitive device to discharge said one of the controllable polarization means each time the light beam changes its position from one of the output positions to another and changes the output signal of said one or said one other photosensitive device whereby the light beam is continually shifted from one output position to another in a repeating sequence.

2. The electro-optic system of claim 1 wherein each photosensitive device is a photosensitive switching means which is directly activated by the light from the light beam on one of the output positions and is coupled by the coupling circuit means to one of the control circuit means for switching electrical energy to or away from said one of the controllable polarization means.

3. The electro-optical system of claim 1 wherein:
   said separate photosensitive device is a photoelectric element in each of the output positions to sense the light at that position and provide an output signal indicative of the presence and absence of said light beam in the particular output position; and
   said control circuit means includes a separate electronic switch responsive to the output signal from each one of said photoelectric devices for switching electrical energy either to or away from one of the controllable polarization means.

References Cited
UNITED STATES PATENTS

| | | | |
|---|---|---|---|
| 3,191,040 | 6/1965 | Critchlow | 250—209 |
| 3,220,013 | 11/1965 | Harris. | |
| 3,234,391 | 2/1966 | Velde | 250—209 |
| 3,279,341 | 10/1966 | Arkell et al. | |
| 3,375,374 | 3/1968 | Niccolls | 250—209 |
| 3,391,970 | 7/1968 | Sincerbox | 350—150 |

ROBERT SEGAL, Primary Examiner

U.S. Cl. X.R.

250—208; 350—150, 157